(12) United States Patent
Bargholtz et al.

(10) Patent No.: US 7,157,670 B2
(45) Date of Patent: Jan. 2, 2007

(54) ADHESIVE SYSTEM FOR ATTACHING PTC HEATER TO A WAX MOTOR

(75) Inventors: William E. Bargholtz, Palmyra, WI (US); Brian A. Stelloh, Franklin, WI (US)

(73) Assignee: Ark-Les Corporation, Stoughton, MA (US)

( * ) Notice: Subject to any disclaimer, the term of this patent is extended or adjusted under 35 U.S.C. 154(b) by 206 days.

(21) Appl. No.: 10/947,588

(22) Filed: Sep. 22, 2004

(65) Prior Publication Data
US 2006/0087395 A1    Apr. 27, 2006

(51) Int. Cl.
*H05B 1/02*   (2006.01)

(52) U.S. Cl. .................. 219/505; 219/483; 219/542; 219/538

(58) Field of Classification Search .............. 219/490, 219/491, 496, 504, 505, 483, 539, 552, 542, 219/538
See application file for complete search history.

(56) References Cited

U.S. PATENT DOCUMENTS

| 5,326,418 | A | * | 7/1994 | Yeh .......................... 156/291 |
| 5,572,869 | A | | 11/1996 | Schantz et al. |
| 5,799,625 | A | * | 9/1998 | Ziolek et al. ............... 123/41.1 |
| 5,836,324 | A | * | 11/1998 | Johnson et al. ........... 134/58 D |
| 6,121,588 | A | * | 9/2000 | Cerruti ....................... 219/511 |
| 6,852,955 | B1 | * | 2/2005 | Golan et al. ................ 219/505 |

* cited by examiner

*Primary Examiner*—Mark Paschall
(74) *Attorney, Agent, or Firm*—Boyle Fredrickson Newholm Stein & Gratz S.C.

(57) ABSTRACT

Improved adhesion, electrical connection, and thermal connection between an electrical heater and a wax motor element are obtained by using multiple zones of different adhesives optimized for different properties. The location of the zones and the area of the zones may be a controlled to effect a trade off between different properties and to limit the expression of the conductive adhesive.

16 Claims, 6 Drawing Sheets

ADHESIVE SYSTEM FOR ATTACHING PTC HEATER TO A WAX MOTOR

CROSS-REFERENCE TO RELATED APPLICATIONS

STATEMENT REGARDING FEDERALLY SPONSORED RESEARCH OR DEVELOPMENT

BACKGROUND OF THE INVENTION

This invention relates to the assembly of wax motors of the type used in household appliances such as washing machines and dishwashers.

Wax motors are disclosed in U.S. Pat. No. 5,572,869 assigned to the assignee of the present invention and hereby incorporated by reference.

In such wax motors, a metal housing holds wax and a piston so that expansion of the wax when the housing is heated, drives the piston outward. The housing may be heated by a positive temperature coefficient (PTC) resistor attached to the housing. The PTC resistor may have one face in both thermal and electrical contact with the metal housing so that the metal housing may both receive heat from the heated element and serve as one electrode for that resistor.

In order to ensure good thermal contact between the housing and the PTC resistor, and to increase the robustness of the assembly, an adhesive may be placed between the housing and resistor. This adhesive may be a thin layer of thermally conductive adhesive that is nominally electrically insulating, but perforated by the operating voltage of 120 volts to allow conduction between the housing and PTC resistor. Alternatively, the adhesive may be a thermally conductive adhesive with electrically conductive particles dispersed therein.

The use of a thin layer of electrically insulating adhesive that is perforated by the line voltage does not always establish a reliable electrical contact between the housing and resistor resulting in an unnecessarily high rejection rate for tested units. On the other hand, electrically conductive adhesives have proven difficult to apply with a propensity to create short circuit paths across the sides of the resistor when the housing and resistor are pressed together and adhesive is squeezed out from between them.

The selection of possible adhesives is limited by the fact that the adhesive must provide some gap filling qualities and the ability to accommodate different coefficients of expansion of the metal housing of the wax motor and the resistor element over a wide temperature range of heating and cooling. It is difficult to find an electrically conductive adhesive that provides the necessary space filling characteristics, compliance to permit thermal expansion, thermal conductivity, and adhesive strength.

BRIEF SUMMARY OF THE INVENTION

The present invention provides an adhesive system in which multiple distinct zones of different types of adhesives are used to assemble PTC resistor and wax motor together. These distinct zones allow the selection of individual adhesives optimized for different properties. Further, by placing the conductive adhesive within zones of non-conductive adhesive, the non-conductive adhesive can be used to corral the conductive adhesive limiting its potential for creating short circuit paths.

Specifically, the present system provides a thermal actuator of a type having a wax motor element with a face attached to a PTC resistor where a first adhesive material attaching the PTC resistor to the face of the wax motor is placed in a first zone on the face and a second adhesive material attaching the PTC resistor to the face of the wax motor is placed in a second zone on the face. The first and second adhesive materials have substantially different properties of electrical conduction. The first and second adhesives may also have different thermal conduction properties.

Thus, it is one object of at least one embodiment of the invention to optimize properties of adhesion and thermal conductivity independently of electrical conductivity through the use of multiple adhesives with independently adjustable zones.

The first adhesive may have substantially greater electrical conductivity than the second adhesive and the second adhesive may have stronger adhesive properties than the first adhesive.

Thus, it is another object of at least one embodiment of the invention to provide improved adhesion over that which can be obtained by suitable electrically conductive adhesives.

The first adhesive may have substantially greater electrical conductivity than the second adhesive and the first zone may be substantially smaller an area than the second zone.

Thus, it is another object of at least one embodiment of the invention to limit the amount of conductive adhesive used to eliminate problems of inadvertent short circuits.

The adhesives may be elastic to accommodate different coefficients of thermal expansion between the face of the wax motor and the PTC resistor.

Thus, it is another object of at least one embodiment of the invention to provide a system that can accommodate the wide range of temperatures required of the interface between a heater and a metal housing.

The first adhesive may have greater electrical conductivity than the second adhesive and the second adhesive may be placed in two independent areas flanking an area of the first zone.

Thus, it is another object of at least one embodiment of the invention to provide control of the conductive material by corralling it with non-conductive material.

These particular objects and advantages may apply to only some embodiments falling within the claims and thus do not define the scope of the invention.

DETAILED DESCRIPTION OF THE PREFERRED EMBODIMENT

Figure 1:
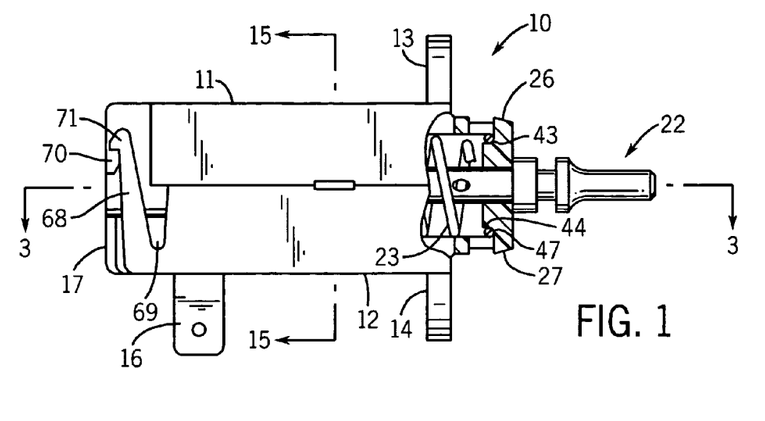
FIG. 1 is a right side view in elevation of an actuator assembly of the present invention.

FIG. 1 shows an actuator assembly 10 for a soap dispenser in a dishwasher. The assembly 10 includes a top casing section 11 and a bottom casing section 12. The casing sections 11, 12 extend longitudinally, which is from left to right as seen in FIG. 1. Apertured lugs 13, 14 (also seen in FIGS. 1, 4, 5 and 12) are integrally formed with casing sections 11, 12, near the front end, for attachment of the assembly 10 within a larger piece of apparatus. Contact blades 15, 16 on electrical terminals 201 extend downwardly near the rear or base end wall 17, for plugging the assembly 10 into a source of electrical energy. The casing sections 11, 12 are made of a synthetic polyester or polyamide material, such as Celanese 1503-2; Celanex 3310; Celanex 7700 or IMPET 530.

Figure 3:
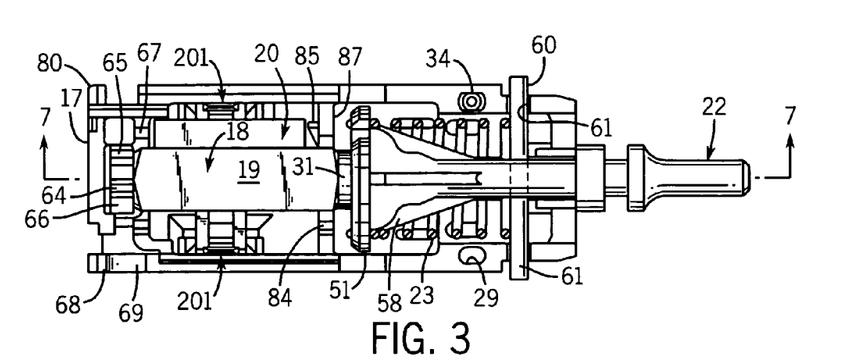
FIG. 3 ms sectional view of the assembly of FIG. 1 taken in the plane indicated by line 3—3 in FIG. 1.
Figure 4:
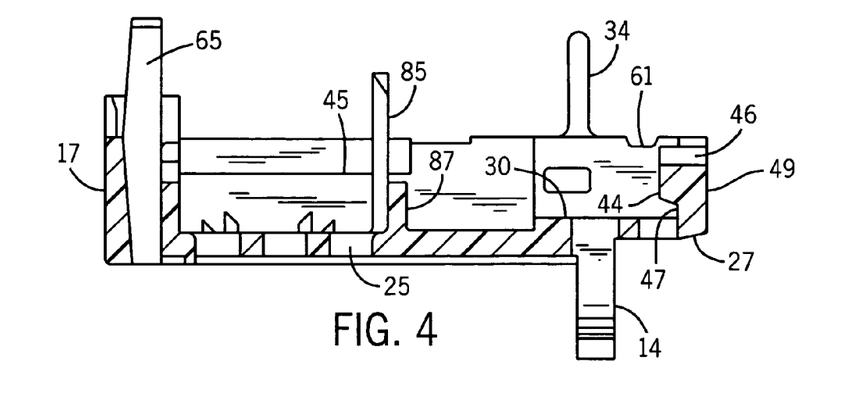
FIG. 4 is a sectional view taken in the plane indicated by line 4—4 in FIG. 2.
Figure 5:
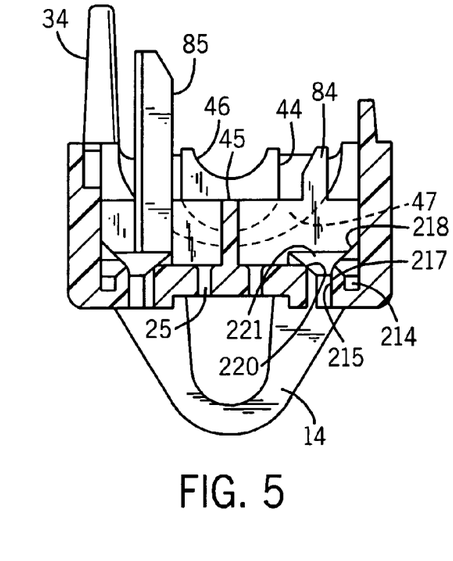
FIG. 5 is a sectional view taken in the plane indicated by line 5—5 in FIG. 2.
Figure 11:
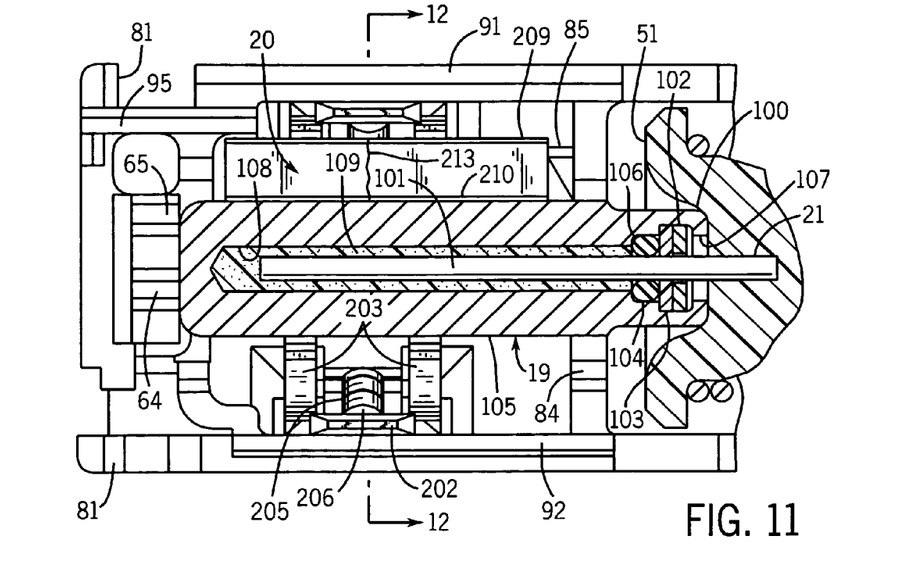
FIG. 11 is a top sectional view of the actuator seen in FIG. 3.

As seen in FIG. 3, a positive temperature coefficient (PTC) resistor 20 is mounted inside the casing sections 11, 12. The resistor 20 receives electrical current supplied through contact blades 15, 16 and heats up to apply heat to a wax motor element 18. The wax motor element 18, is mounted inside the casing sections 11, 12. As seen in more detail in FIG. 11, the wax motor element 18 has a metal housing 19. As seen in FIG. 11, the housing 19 has first counterbore 106 in which an O-ring 104 of temperature resistant material is positioned. A brass washer 102 and a washer 103 made of a fluorocarbon material, such as Teflon, are stacked in a second counterbore 107 of larger diameter than the first counterbore 106. The brass washer 102, being of softer material than the hardened shaft 101, is retained by a crimp in the housing 19. A hardened shaft 101, preferably of stainless steel, provides an operating stem 21 that extends out of the housing 19 through openings in the centers of O-ring 104, Teflon washer 103, and brass washer 102. The Teflon washer 103 is provided with an interference fit with shaft 101. A thermally expansive material 109, such as wax or another suitable material, is contained within a main cavity 108 in the housing.

Returning to FIGS. 3 and 12, the positive temperature coefficient (PTC) resistor 20 with ohmic layers 209, 210 is attached to one side of the thermal actuator housing 19 by one of several methods to be described. Current is supplied through terminals to resistor 20 to produce resistive heating. Heat is conducted to the housing 19 from resistor 20, and from there, is conducted to the material 109, causing it to expand and causing the operating stem 21 of shaft 101 to move out from crimped end of the housing 100. O-ring 104 is sized relative to the counterbore 106, such that it is allowed to float in the manner of a hydraulic seal. The operating stem 21 is moved through an operating stroke of approximately ¼ inch.

Figure 7:
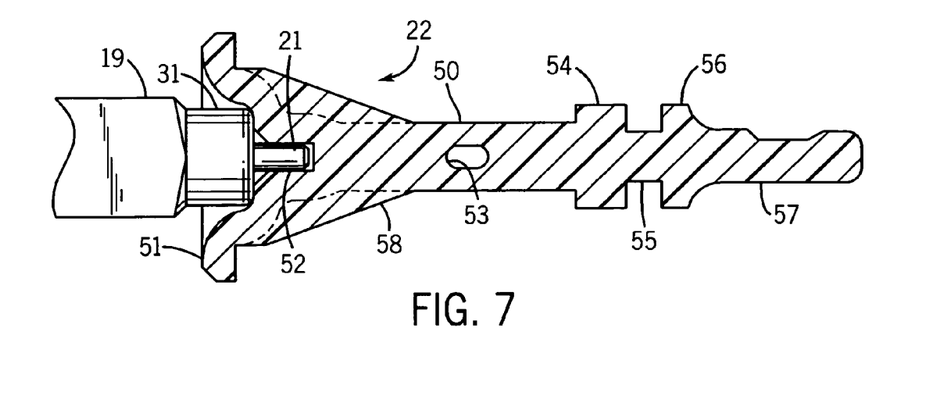
FIG. 7 is a sectional view taken in the plane indicated by line 7—7 in FIG. 3.
Figure 8:
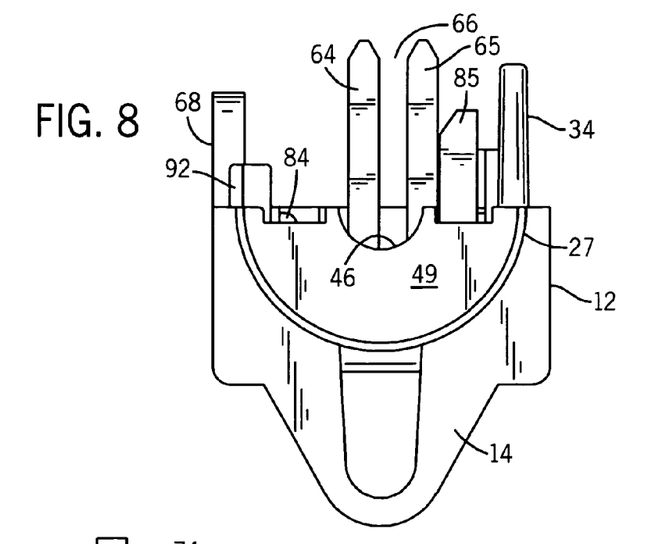
FIG. 8 is a right end view taken in the plane indicated by line 8—8 in FIG. 2.
Figure 9:
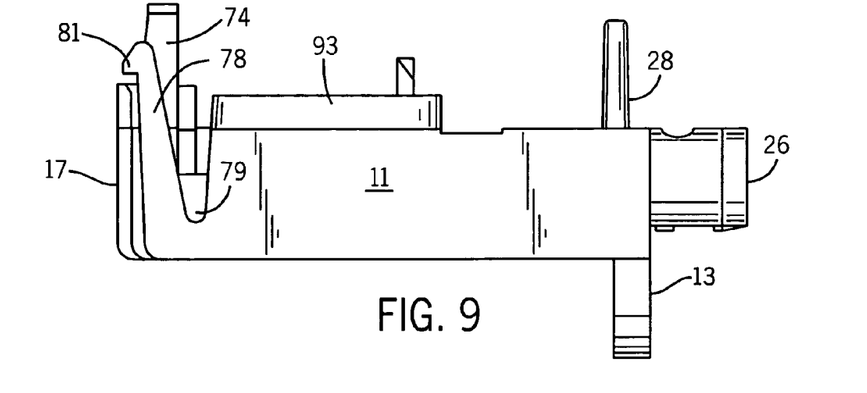
FIG. 9 is a left side view of the top casing section of FIG. 1 turned upside down.

Operating stem 21 (FIG. 7) has a tip that is received in a hole 52 in a base 51 of a plunger 22. The plunger 22 is made of one of the materials specified above for the casing sections 11, 12 and has a shaft end 50 that extends out of the casing sections 11, 12. This shaft end 50 is formed with a nose 57, and first and second annular flanges 54 and 56 are separated by an annular groove 55 for connection to apparatus controlling the soap dispenser door. Ribs 58 extend from the base up the sides of the shaft end 50. The ribs 58 extend along the inner diameter of the spring, for a portion of their length, to support the inner diameter of the spring 23 and prevent the spring 23 from buckling.

As seen in FIGS. 2, 4, 5, 10 and 12, the casing sections 11, 12 are formed with vents 24, 25 to vent heat from the casing sections 11, 12. The casing sections 11, 12 also provide cowl sections 26, 27 (FIGS. 1, 8, 9 and 10) which together form a cowl extending from one end of the casing.

The top casing section 11 has a connecting pin 28 (FIG. 9) extending down from a left side wall to be received in a slot 29 (FIGS. 2 and 3) in a left sidewall of the bottom casing section 12. On the right sidewall, a pin 34 extends up from the bottom section to be received in a slot (not shown) in the top section similar to slot 37. Inside the cowl sections 26, 27 are arcuate sections 43, 44 (FIGS. 1, 2, 3 and 5) which form a projection within a circular groove 47 inside the cowl sections 26, 27. One end of the coiled compression spring 23 is received in this groove 47, with an interference fit over arcuate sections 43, 44 to radially locate the inner diameter of the spring 23 and to hold the casing halves together. Cowl sections 26, 27 form an axial bore 46 through the end wall 49 to allow extension of the plunger 22 outside the casing sections 11, 12.

The actuator stem also has a slot 53 transverse to its longitudinal axis for receiving a metal pin 60 (FIGS. 3 and 7) during assembly. Pin 60 is received horizontally through casing slots 61 in the casing sections 11, 12 during assembly, as seen in FIG. 3. The casing sections 11, 12 are put together and the pin 60 is then removed to allow one end of the spring to move forward over the internal arcuate sections 43, 44 formed on the opposing end of the casing sections 11, 12.

Figure 2:
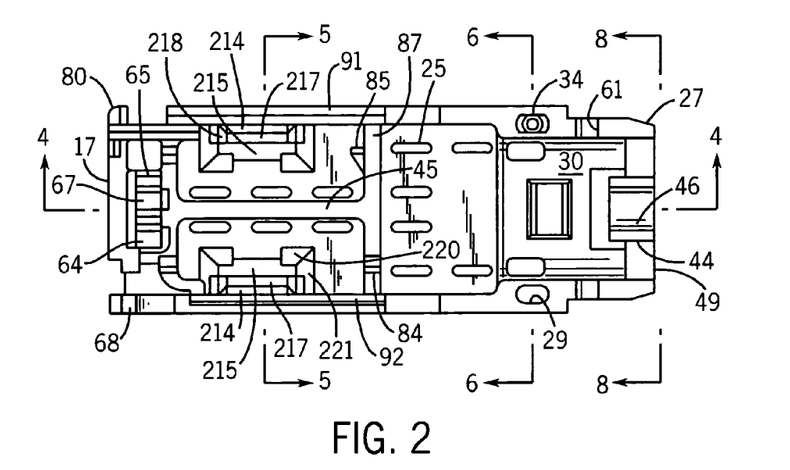
FIG. 2 is a top plan view of bottom casing section of the actuator assembly of FIG. 1.
Figure 6:
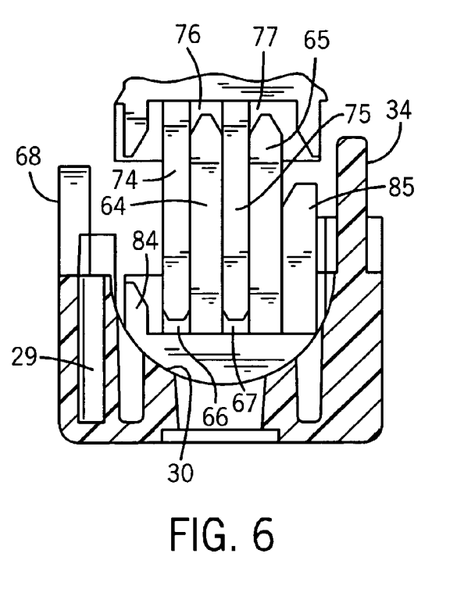
FIG. 6 is a sectional view taken in the plane indicated by line 6—6 in FIG. 2.
Figure 10:
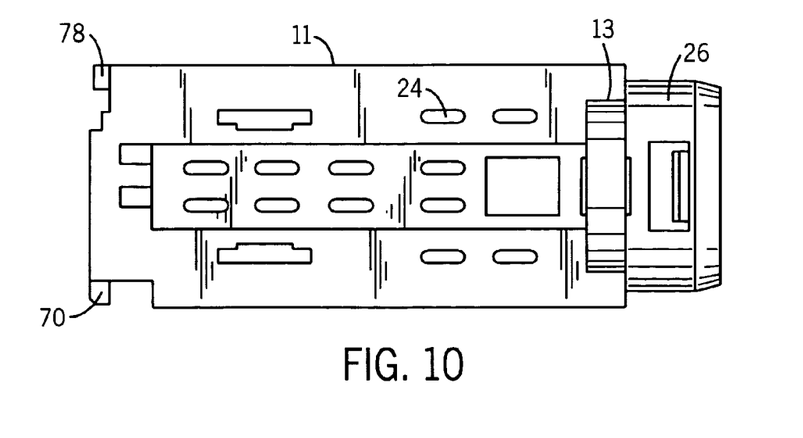
FIG. 10 is top plan view of the top casing section of FIGS. 1 and 9.

A web 45 in an H-shape, as seen from the top in FIG. 2, is positioned towards the base end wall 17 of the two casing sections 11, 12. A similar web (not shown) is formed on the top casing section 11, so that the webs will enclose the housing 19 and form a frame for holding the housing 19. Just inside the base end wall 17, the lower casing section 11 provides two stab connecting fingers 64, 65 (FIGS. 2, 3, 4, 6, 8) with tapered tips which fit in slots 76, 77 alternating with like fingers 74, 75 (FIG. 6) on the opposing casing section 12. Fingers 74, 75 are received in slots 66, 67 (FIG. 10). The combination of four meshed fingers 64, 65, 74, 75 forms additional support just inside the base end wall 17, and fingers 64, 65, 74, 75 are held against lateral deformation by the base end wall 17.

In addition, each casing section 11, 12 has a third stab connecting finger 68, 78 spaced from one edge of the end wall 17 and located on one corner of the casing section 11, 12. This finger 68, 78 engages a tab 70, 80 extending laterally from the base end wall 17 on an opposing corner of the other casing section 11, 12. There is a relief 69, 79 next to each third finger 68, 78 to allow the finger 68, 78 to flex as it slides around the tab 70, 80. A projection 71, 81 adjacent to the end then protects the finger 68, 78 against reversing direction around the tab 70, 80.

During assembly, spring 23 is compressed on plunger 22 and pin 60 is inserted in slot 53 to retain spring 23 in a compressed state. Casing sections 11 and 12 are assembled with pin 60 projecting through casing slots 61, and when the pin 60 is removed, the end of the spring 23 moves forward over arcuate sections 43, 44 as seen in FIG. 1. It should be noted that the connecting pins 28, 34 on opposite sides are located on opposite casing sections 11, 12, and that fingers 64, 65, 74 and 75 mesh together to provide symmetrical and balanced loading across the casing joint. After the casing sections have been joined, the pin 60 is removed to allow the spring 23 to fit over arcuate sections 43, 44 and into groove 47. The end coils of the spring 23 capture and contain the arcuate sections 43, 44 of the casing sections 11, 12 to positively hold the casing sections 11, 12 together.

Along the sidewalls, there are overlapping flanges 91, 92, 93 and 94 seen in FIGS. 2, 9, 11 and 12 to provide a mating interengagement of the sidewalls along a portion of the casing joint. Member 95, seen best in FIGS. 11 and 14, encloses one corner of the housing near the base end wall 17.

Figure 12:
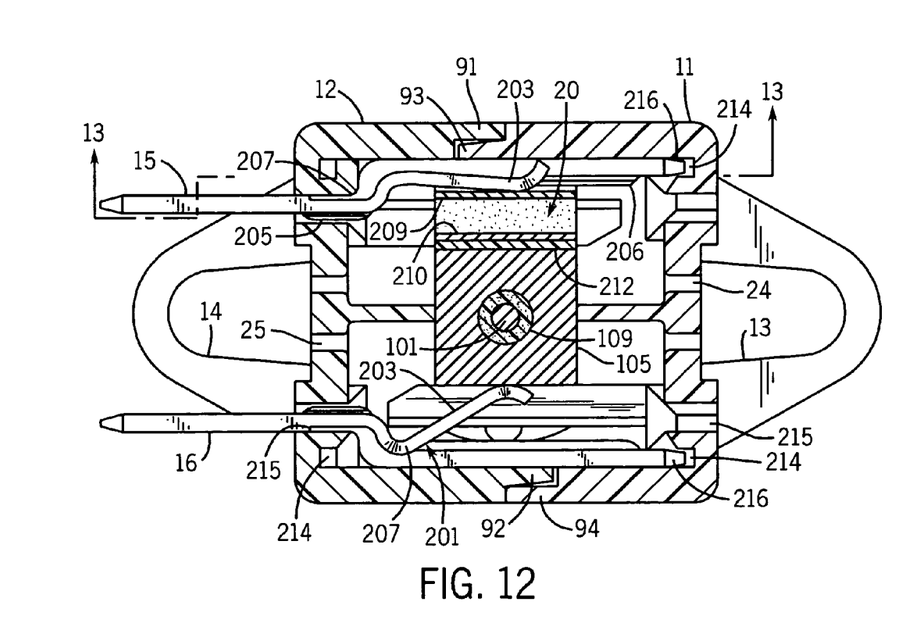
FIG. 12 is a sectional view taken in the plane indicated by line 12—12 in FIG. 11.
Figure 13:
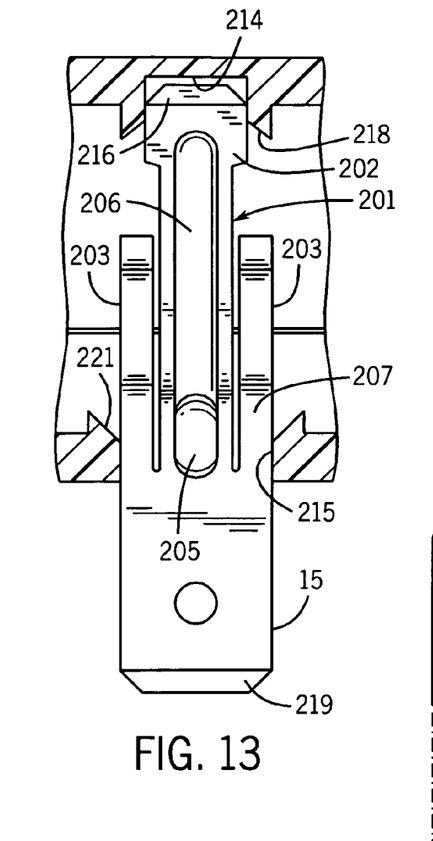
FIG. 13 is a side plan view of one of the terminals seen in FIG. 12.

Referring to FIGS. 12 and 13, terminals 201 are each provided with bifurcated, flexible leg contacts 203 to distribute the current flow onto the ohmic layer 209 of resistor 20. This improves heating response because the ohmic layers 209, 210 are of relatively low conductivity compared to the terminal 201. The bifurcated contacts 203 provide increased reliability in the event that a fracture occurs in the resistor 20 because the remaining portions would then continue to function unimpeded.

Referring to FIG. 13, each of the two terminals 201 has a conventional contact blades 15, 16 and a longitudinal beam section 202 containing a longitudinal rib 206 to provide reinforcement and stiffness. The rib 206 is extended around bend section 204 as shown by reference 205 in FIG. 12. The terminal 201 is thinned at section 207 by coining or other means to permit deflection of the flexible leg contacts 203 and to enable a resilient connection of the leg contacts 203 against ohmic layer 209 and housing 19 as seen in FIG. 12.

Referring to FIG. 12, PTC resistor 20 is shown with conventional ohmic layers 209 and 210, shown in exaggerated thickness in the drawing. The purpose of these layers is to conduct current to the resistor 20 to cause the heating. The efficiency of ohmic layer 209 can be improved by applying current at multiple locations from a terminal of lower resistivity than the ohmic layer 209. This is done with bifurcated flexible leg contacts 203. Further, a fracture of the ceramic resistor 20 will be tolerated without a loss of reliability and performance by supplying power to both sides of the fracture 213.

Figure 14:
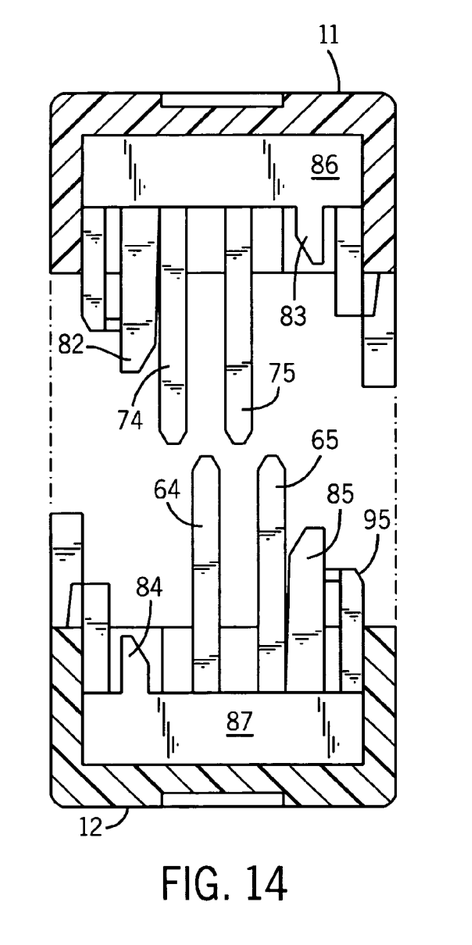
FIG. 14 is an exploded, sectional view of the assembly of FIG. 1, with the actuator removed.
Figure 15:
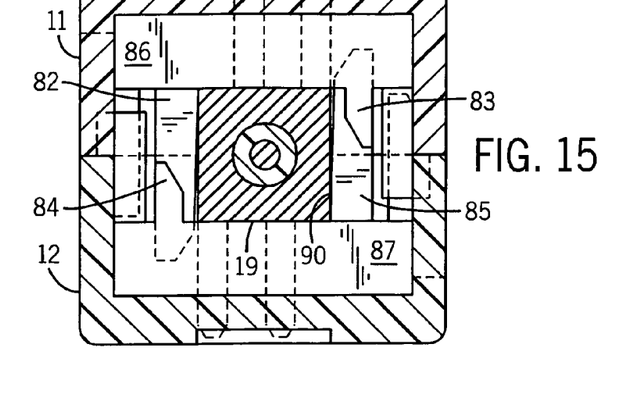
FIG. 15 is a sectional view taken in the plane indicated by line 15—15 in FIG. 1.

Referring to FIGS. 3 and 14, bulkhead sections are formed by overlapping side members 82–85 and upper and lower walls 86, 87 which form a barrier having a window 90, the barrier fitting closely around the housing 19 to isolate and separate the sealed end of actuator housing 19 from the PTC resistor 20. Leakage of thermally expansive material from the sealed end of housing 19, if allowed to contact resistor 20, could impair performance of the resistor 20 and cause it to overheat. The bulkhead sections prevent any leaked material from migrating back to the region of the resistor 20.

The resistor 20 is rectangular in shape to fit the sidewall of actuator housing 19. The PTC resistor 20 is attached to the housing using one of three materials, either a) a thermally conductive grease, b) a thin layer of thermally conductive adhesive that is perforated by an operating voltage of 120 volts to allow conduction between the PTC resistor and actuator housing or c) a thermally conductive adhesive with electrically conductive particles dispersed therein. This adhesive 212 is shown in exaggerated thickness in FIG. 12.

Each of these three materials provides a thermally conductive adhesive 212 allowing multiple conductive paths between the resistor 20, ohmic layer 210 and the wall of the actuator housing 19. In the case of the adhesive with conductive particles, the conductive particles can also be uniformly sized to more evenly distribute the current conducted therethrough.

Referring to FIGS. 2, 12 and 13 another feature of the construction assists in correct and easy assembly of the terminals 201 in the casing sections 11 and 12. The casing sections 11 and 12 are formed with pockets 214 located between T-shaped apertures 215 for receiving the contact blades 15, 16 and respective sidewalls of the casing sections 11, 12. The upper end 216 of each terminal 201 is narrower than each contact blade 15, 16 and is laterally offset from the contact blade 15, 16. The contact blades 15, 16 are assembled by insertion from the inside of one casing section 12 used as the lower housing section, and when the top casing section 11 is placed on top of lower casing section 12, the upper end 216 of the terminals 201 will be received and held in proper position, providing the terminals 201 are assembled with the bifurcated contacts 203 facing to the inside of the casing section 11, 12. The pockets 214 are offset from the apertures 215 to account for the offset in the terminals 201 caused by the bend at reference 205.

As seen in FIG. 2, the casing sections 11, 12 each have a pair of apertures 215 for receiving the contact blades and pockets 214 disposed between respective apertures 215 and respective walls of each respective casing section 11, 12 to allow the casing sections 11, 12 to be used interchangeably in assembly with the terminals 201.

The pockets 214 include ramp surfaces 217 for selectively guiding chamfered upper ends 216 of terminals 201 into pockets 214. The pockets 214 also include ramps 218, seen best in FIG. 5, for guiding the chamfered lower ends 219 of contact blades 15, 16 away from pockets 214 and into apertures 215. Additional ramp surfaces 220, 221 are provided around T-shaped apertures 215 to guide the lower ends of contact blades 15, 16 into apertures 215.

Figure 16:
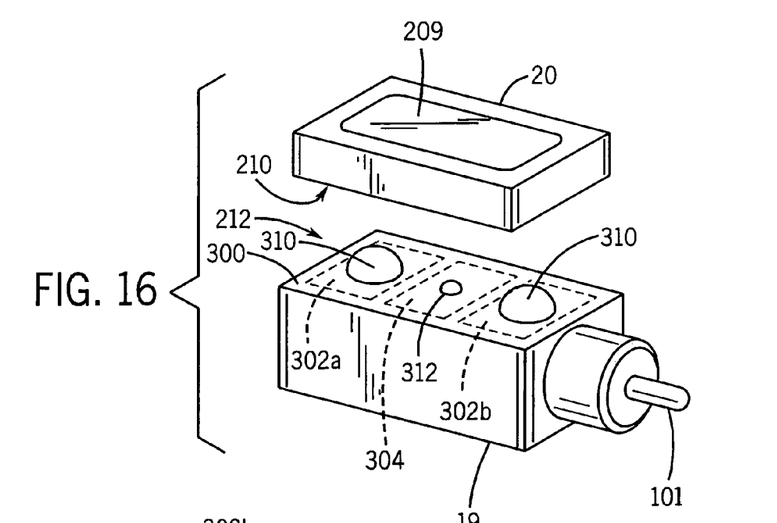
FIG. 16 is an exploded perspective view of the wax motor and the PTC resistor used in the actuator of the present invention showing placement of the adhesive on the upper surface of the wax motor.

Referring now to FIG. 16, the PTC resistor 20 may be assembled to the metal housing 19 to contact an upper face 300 of the metal housing 19. Before this assembly, adhesive 212 is placed at the interface between the PTC resistor 20 and face 300, preferably, but not necessarily on the face 300.

In the present invention, two different adhesives 310 and 312 are placed in distinct zones 302a, 302b and 304 on face 300 spaced along the length of the face 300 generally aligned with the shaft 101 of the wax motor element 18. A first adhesive 310 may be placed in two locations indicated by zones 302a and 302b flanking zone 304 at which a second adhesive 312 is placed.

The first adhesive 310, in a preferred embodiment is a two part silicon adhesive that incorporates thermally conductive material to increase its thermal conductivity. A suitable adhesive 310 provides a thermal conductivity of 0.83 watts/° C. meter and a strength of 700 psi. This adhesive provides strength to the joint and ensures good thermal connection between the resistor 20 and the face 300.

As described above, the second adhesive 312 is placed at zone 304 and is a one part silicon adhesive that incorporates electrically conductive material such as carbon or silver particles. A suitable adhesive 312 provides an electrical conductivity of 150 ohms centimeters and a strength of 475 psi. This adhesive 312 provides principally conduction between the resistor 20 and the face 300 and is limited to that required amount necessary to provide electrical conduction yet to reduce any extrusion of the adhesive as the PTC resistor 20 is pressed against face 300. The localized area of conduction provided by the second adhesive 312 at zone 304 is acceptable because of the current spreading effect of ohmic layer 210 on the surface of the PTC resistor 20.

It will be understood that adhesive 312 provides some adhesion and thermal conductivity and adhesive 310 provides some electrical conductivity through "punch through" of adhesive 310 under line voltages.

The amount of adhesive 310 at zones 302a and 302b is substantially greater than the amount of adhesive 312 at zone 304

Figure 17:
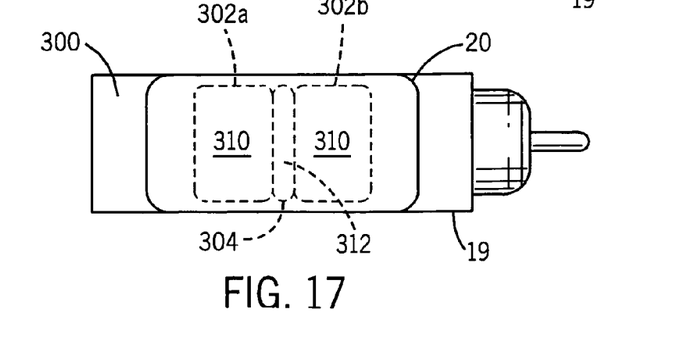
FIG. 17 is a top plan view in phantom showing the spreading of the adhesives of FIG. 16 when the PTC resistor is compressed against the housing.

Referring now to FIG. 17, when the PTC resistor 20 is clamped against the housing 19 the zones 302a and 302b of adhesive 310 expand to corral the adhesive 312 at zone 304. This corralling property plus the carefully metered amount of the adhesive at zone 304 reduces the risk of excess extrusion of the conductive adhesive in zone 304 such as could create short circuits between ohmic layers 210 and 209 of the PTC resistor 20.

The PTC resistor 20 is held clamped to the housing 19 for sufficient time for the adhesive in zones 302a and 302b to cure at which time the wax motor and PTC resistor may be handled as a unit for subsequent manufacturing steps as described above.

It will be understood that the adhesive may alternatively be placed on the ohmic layer 210 of the PTC resistor prior to compression or that some adhesive may be placed on the housing 19 and some on the PTC resistor 20.

It is specifically intended that the present invention not be limited to the embodiments and illustrations contained herein, but include modified forms of those embodiments including portions of the embodiments and combinations of elements of different embodiments as come within the scope of the following claims.

We claim:

1. In a thermal actuator of a type having a wax motor element having a face attached to a PTC resistor, the improvement comprising:
   a first adhesive material attaching the PTC resistor to the face of the wax motor in a first zone of the face;
   a second adhesive material attaching the PTC resistor to the face of the wax motor in a second zone of the face; and
   wherein the first and second adhesive material have substantially different properties of electrical conduction.

2. The thermal actuator of claim 1 wherein the first and second adhesives provide different thermal conduction properties.

3. The thermal actuator of claim 1 wherein the first adhesive has substantially greater electrical conductivity than the second adhesive.

4. The thermal actuator of claim 3 wherein the second adhesive has stronger adhesive properties than the first adhesive.

5. The thermal actuator of claim 1 wherein the first and second adhesives have substantially different adhesive properties.

6. The thermal actuator of claim 1 wherein the first adhesive has substantially greater electrical conductivity than the second adhesive and the first zone is substantially smaller in area than the second zone.

7. The thermal actuator of claim 1 wherein the first and second adhesive are elastomeric to accommodate different coefficients of thermal expansion between the face of the wax motor and the PTC resistor.

8. The thermal actuator of claim 1 wherein the first adhesive has substantially greater electrical conductivity than the second adhesive and wherein the second adhesive material attaches the PTC resistor to the face of the wax motor in at least two independent areas flanking an area of the first zone.

9. A method of assembling a wax motor to a PTC resistor with a first and second adhesive material comprising the steps of:
   (a) applying a first adhesive material to one of a PTC resistor and the wax motor in a first zone;
   (b) applying a second adhesive material to one of the PTC resistor and the wax motor in a second zone, wherein the second adhesive material has substantially different properties of electrical conduction than the first adhesive material; and
   (c) compressing the PTC resistor and wax motor together about the first and second adhesives; and
   (d) curing the first and second adhesives.

10. The method of claim 9 wherein the first and second adhesives provide different thermal conduction properties.

11. The method of claim 9 wherein the first adhesive has substantially greater electrical conductivity than the second adhesive.

12. The method of claim 11 wherein the second adhesive has stronger adhesive properties than the first adhesive.

13. The method of claim 9 wherein the first and second adhesives have substantially different thermal conductivity and electrical conductivity properties.

14. The method of claim 9 wherein the first adhesive has substantially greater electrical conductivity than the second adhesive and the first zone is substantially smaller in area than the second zone.

15. The method of claim 9 wherein the adhesives are elastomeric to accommodate a different coefficient of thermal expansion between the wax motor and the PTC resistor.

16. The method of claim 9 wherein the first adhesive has substantially greater electrical conductivity than the second adhesive and wherein the second adhesive material attaches the PTC resistor to the wax motor in at least two independent areas flanking an area of the first zone.

* * * * *